UNITED STATES PATENT OFFICE.

WILLIAM W. MACFARLANE, OF PHILADELPHIA, PENNSYLVANIA.

PROCESS OF PREPARING LOGWOOD EXTRACTS.

SPECIFICATION forming part of Letters Patent No. 417,492, dated December 17, 1889.

Application filed March 6, 1888. Serial No. 266,343. (No specimens.)

*To all whom it may concern:*

Be it known that I, WILLIAM W. MACFARLANE, a citizen of the United States, residing in the city and county of Philadelphia, and State of Pennsylvania, have invented certain new and useful Improvements in the Process of Preparing Logwood Extracts, of which the following is a specification.

The object of this invention is to develop the coloring-matter derived from logwood, which is the heart-wood of *Hæmatoxylon Campechianum*. The developing of the coloring-matter is ordinarily done by the process called "curing," which consists in sprinkling the chipped or ground wood with water and spreading it in thick layers on a floor. It is necessary to move or agitate it frequently, so as to avoid too much of an increase in temperature, caused, probably, by a kind of fermentation or decomposition of the glucosides. This process of curing has proved to be very imperfect and wasteful, inasmuch as it is impossible to develop all the coloring-matter before some of it is destroyed.

By means of my invention I am able to develop or render of value a large percentage of the coloring-matter originally contained in the wood, and to so control the process that there is but little or no destruction of the coloring-matter.

To carry my invention into effect, I obtain a decoction of either cured wood or the wood as it comes from the chipping or grinding machines. Wood which has not undergone the curing process yields the best results. I subject this solution to the action of free chlorine—that is, chlorine uncombined with any other substance in the form of gas or in solution, either by mixing a solution of chlorine with the decoction of wood, or by bringing the solution of the extractive matter directly in contact with chlorine gas or a mixture of the gas and air, but in either case the extractive matter must not be alkaline. Mixing a diluted solution of the extractive matter with a recently-prepared aqueous solution of chlorine is an effective method. When chlorine is forced or drawn through a solution of the extractive matter of logwood, the coloring-matter is developed, but if the coloring-matter is subjected to an excess of chlorine it is soon destroyed. It is difficult to prevent some portions of the solution from coming in contact with more chlorine than others, and hence some of the coloring-matter is destroyed before it is all developed. I am able to overcome this difficulty and to obtain nearly as good results as are obtained by adding a solution of chlorine to a solution of the extractive matter of logwood by subjecting repeatedly a large quantity of the solution to the action of a relatively-small quantity of chlorine gas. To accomplish this, I circulate the solution of the extractive matter through any suitable vessel so arranged as to expose as large a surface of the solution as possible, and into this vessel chlorine gas is delivered directly from a generator. The circulation of the solution should be as rapid as possible, and the delivery of chlorine regular and not faster than it is absorbed by the solution. The solution is thus circulated in an atmosphere of chlorine and air. The quantity of chlorine used is regulated by the quantity of materials put in the generator.

Solutions, even of the same density, of the extractive matter in logwood will contain variable quantities of undeveloped coloring-matter from the following causes: First, the quantity and quality of the coloring-matter in logwood from different regions varies; second, the quantity of undeveloped coloring-matter will vary in different lots of wood from the same region, depending upon the length of time and the conditions under which it has been exposed after the cutting away of the sap-wood; third, the variations in the methods used for extraction; fourth, if cured wood has been used, the quantity of undeveloped coloring-matter will depend upon the degree of perfectness to which the curing process has been carried, and a portion of the chlorine is probably used in acting on some of the other organic compounds which are present with the coloring-matter. Therefore it is impossible to state just what quantity of chlorine is necessary to develop to the fullest extent the coloring-matter in a given quantity of extract.

To determine the percentage of chlorine necessary to develop to the best advantage the coloring-matter in a given extract, I make a series of experiments, as follows: I first judge as near as possible of the quantity of dry wood a given quantity of the extract represents. Then I weigh or measure several equal portions of the extract. To one I add a portion of a standard solution of chlorine equivalent in chlorine to three per cent. of the weight of the dry wood. To some of the other portions I add less chlorine, and to some I add more. I then make dyeing tests of these solutions, using skeins of woolen yarn of equal weights mordanted with bichromate of potash and tartaric acid, or otherwise properly prepared to test the solution. By making these tests under the same conditions, with the exception of the quantity of chlorine used, I can determine the fullest and best shade obtained, and hence the best percentage of chlorine to use. In practice a sample of logwood extract 42° has given the best result when from nine to ten per cent. of its weight in chlorine was used to develop the coloring-matter. Thus a sample of wood taken from a stick about six inches in diameter and from that portion of the cross-section midway between the outside and the center, so that it had not been exposed to the air, was divided into shavings, and twice subjected, with about twenty times its weight in water, to five pounds steam-pressure for half an hour. The coloring-matter in the resulting extract was then developed. The best results were obtained by using from four and a half to five per cent. of chlorine referred to dry wood. The sample of wood contained twenty-seven and one-tenth per cent. of water. The above results were obtained by using a solution of chlorine.

When the solution of the extractive matter is brought in contact with chlorine gas, as described above, and if the temperature of the solution is maintained at 150° to 180° Fahrenheit during the absorption of the chlorine, about thirty per cent. less chlorine produces nearly the same result as when a solution of chlorine is added to a dilute solution of the extractive matter.

When a solution of crystallized hæmatoxylin is mixed with a solution of chlorine, equivalent in chlorine to about forty per cent. of the weight of the crystallized hæmatoxylin, hæmatein is the principal product of the reaction, and with this quantity of chlorine the maximum dyeing-power of the solution is attained.

When logwood extracts are treated with chlorine, as described herein, a relatively-greater dyeing-power is developed than when crystallized hæmatoxylin is so treated; hence it is probable that in the case of the logwood extract a decomposition of the glucosidis also occurs, yielding either hæmatein or hæmatoxylin, which is converted by the chlorine to hæmatein.

I am aware that it has been proposed to treat logwood extracts with a solution of bleaching-powder, and I do not claim as my invention the use in such cases of substances containing chlorine in combination, my invention being distinguished by the use of free chlorine uncombined with other substances, which, if present, would, on the liberation of the chlorine, affect the character of the product. In the use of the bleaching-powder the solution becomes alkaline in character, while I have found, to secure the desired result, it is essential that the solution be either slightly acid or neutral.

I claim—

1. The within-described improvement in the treatment of the extractive matter of logwood to increase its dyeing-power, the same consisting in subjecting a solution of such matter to the action of free chlorine—that is, chlorine uncombined with other matter, as a gas or in solution, substantially as described.

2. The formation of hæmatein from logwood extract or from hæmatoxylin by treating a solution of the same with chlorine gas or a solution of free chlorine, substantially as described.

In testimony whereof I have signed my name to this specification in the presence of two subscribing witnesses.

WM. W. MACFARLANE.

Witnesses:
S. SPENCER CHAPMAN,
NATHAN C. LANE.